(12) United States Patent
Maeda et al.

(10) Patent No.: US 7,004,399 B2
(45) Date of Patent: Feb. 28, 2006

(54) READER/WRITER DEVICE AND AUTOMATIC TICKET GATE INCLUDING THE SAME FOR CHECKING TICKET

(75) Inventors: Tatsuo Maeda, Kanagawa (JP); Akihiko Yamagata, Kanagawa (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 10/494,463

(22) PCT Filed: Sep. 10, 2003

(86) PCT No.: PCT/JP03/11571

§ 371 (c)(1),
(2), (4) Date: Sep. 9, 2004

(87) PCT Pub. No.: WO2004/025547

PCT Pub. Date: Mar. 25, 2004

(65) Prior Publication Data

US 2005/0001026 A1    Jan. 6, 2005

(30) Foreign Application Priority Data

Sep. 13, 2002    (JP)    .............................. 2002-267915

(51) Int. Cl.
*G06K 19/00* (2006.01)
(52) U.S. Cl. ...................................... 235/487; 235/384
(58) Field of Classification Search ................ 235/387, 235/492, 493, 449, 451
See application file for complete search history.

(56) References Cited

U.S. PATENT DOCUMENTS

| | | | | |
|---|---|---|---|---|
| 4,583,099 | A | * | 4/1986 | Reilly et al. ................. 343/895 |
| 6,194,993 | B1 | * | 2/2001 | Hayashi et al. .......... 340/10.34 |
| 6,353,420 | B1 | * | 3/2002 | Chung ......................... 343/895 |
| 6,452,806 | B1 | * | 9/2002 | Ikeda et al. ................. 361/737 |
| 6,922,173 | B1 | * | 7/2005 | Anderson ................... 343/701 |

FOREIGN PATENT DOCUMENTS

| | | |
|---|---|---|
| JP | 07-093491 | 4/1995 |
| JP | 10-209737 | 8/1998 |
| JP | 11-213108 | 8/1999 |
| JP | 2001-238883 | 9/2001 |

OTHER PUBLICATIONS

Internationali Search Report Jan. 13, 2004.
Supplemental EPO Search Report Oct. 27, 2005.

\* cited by examiner

Primary Examiner—Daniel Stcyr
(74) Attorney, Agent, or Firm—Radar, Fishman & Grauer PLLC; Ronald P. Kananen

(57) ABSTRACT

An antenna unit prevents a communication error by suppressing side lobes formed by an antenna coil segment of a reader/writer device. The antenna unit (200) is used for a reader/writer device (20) whose signal processing circuits (210) and (220) communicate with an IC card (10) via electromagnetic waves, wherein an antenna coil (100) of the IC card (10) relatively gets close to the antenna unit (200). The antenna unit (200) includes the antenna coil segment which forms a loop antenna (202) on a substrate (201) and conductor segments (203) at the periphery of the antenna coil on substantially the same plane of the antenna coil.

10 Claims, 10 Drawing Sheets

READER/WRITER DEVICE AND AUTOMATIC TICKET GATE INCLUDING THE SAME FOR CHECKING TICKET

This application is a National Phase application of International Application No. PCT/JP03/11571, having an international filing date of Sep. 10, 2003. This application additionally claims priority to Japanese Application No. JP2002-267915, filed on Sep. 13, 2002.

TECHNICAL FIELD

The present invention relates to a reader/writer device and an automatic ticket gate including the reader/writer device for checking tickets and, in particular, to a structure of the reader/writer device.

BACKGROUND ART

Such a wireless information transmitter/receiver includes wireless information storage media (hereinafter referred to as "IC cards") and a reader/writer device. For example, the wireless information transmitter/receiver can be applied to an automatic ticket gate to check passenger tickets or an entrance control system.

The IC card has a loop antenna, an IC chip connected to terminals of the loop antenna, and a tuning capacitor on a main surface of a plastic card substrate. The reader/writer device includes a loop antenna, a modulator-demodulator circuit, and a CPU. The reader/writer device transmits data to the IC card by flowing electric currents modulated from 13.56 MHz carrier with transmitting data to the loop antenna, and receives data from the IC card by flowing unmodulated electric currents to the loop antenna.

When the loop antenna of the IC card gets closer to the loop antenna of the reader/writer device, the terminal of the loop antenna of the IC card produces induced voltage caused by the electromagnetic induction. Accordingly, the IC chip receives stable power supply voltage and demodulates modulated waves to receive data transmitted from the reader/writer device. When the IC chip transmits data stored in a memory thereof, the IC chip switches terminal impedance by changing the load therein in accordance with the data. The reader/writer device detects the load changes and demodulates them to receive the data from the IC card. Thus, the IC card and the reader/writer device communicate with each other. Subsequently, a higher level system of the reader/writer device, such as a computer or another external information processing system, utilizes the data to, for example, check passenger tickets or control human entrance (refer to Japanese Unexamined Patent Application Publication No. 10-13312).

In a loop antenna 202 of such a reader/writer device, a flow of electric current i produces magnetic fluxes H shown in FIG. 11. The arrow with dashed line shown in FIG. 12 illustrates combined magnetic fluxes of the fluxes around the loop antenna taken along line XII—XII in FIG. 11. That is, inside the loop antenna 202, since directions of the magnetic fluxes generated along each edge of the loop antenna 202 are the same, an upward magnetic field having its maximum value at the center of the loop antenna 202 is generated. In contrast, outside the loop antenna 202, the direction of magnetic fluxes generated along two neighboring edges of the loop antenna 202 is reversed from the direction of magnetic fluxes generated along the opposing neighboring edges. Accordingly, a downward magnetic field magnetic flux is generated after the magnetic fluxes are combined.

Since a power supply of the reader/writer device is an AC power supply of 13.56 MHz, only one side of the loop antenna 202 will be described. A magnetic field shown by a dashed line in FIG. 13 is generated to form communication spaces to communicate with the IC card. That is, as shown in FIG. 13, a main communication space M, also referred to as "main lobe", having its maximum value at the center of the loop antenna 202, is produced inside the loop antenna 202, while smaller sub communication spaces S, also referred to as "side lobes", are produced at the periphery of the loop antenna 202.

If, as shown by the arrow in FIG. 13, an IC card 10 passes from the sub lobe S through the main lobe M in one direction (from left to right in FIG. 13), a communication error sometimes occurs.

That is, while the IC card 10 is passing through the first side lobe S, an induced voltage is generated in the IC card 10. The IC card 10 receives initial data from the reader/writer device, and then transmits initial data to the reader/writer device. After the reader/writer device receives the initial data, the IC card 10 passes through a boundary B between the side lobe S and the main lobe M, where a magnetic field sufficient for generating a predetermined induced voltage is not produced. Since power supply for the IC card is temporarily blocked, only the IC card is initialized.

Subsequently, the IC card 10 enters the main lobe M. Although the IC card attempts to receive the initial data from the reader/writer device, the reader/writer device attempts to continue the previous communication in the side lobe S. As a result, the reader/writer device regards this communication mismatch between the IC card and the reader/writer device as a communication error.

DISCLOSURE OF INVENTION

Accordingly, it is an object of the present invention to provide an antenna unit of a reader/writer device that prevents a communication error by suppressing side lobes formed in an antenna coil segment of the reader/writer device, to provide a reader/writer device and an information processing system including the antenna unit, and a communication method for the antenna unit, and also to provide a method for manufacturing the antenna unit.

According to the present invention, an antenna unit is included in a reader/writer device whose signal processing circuit communicates with a wireless information storage medium via electromagnetic waves by bringing an antenna coil of the wireless information storage medium close to the antenna unit. The antenna unit includes a loop antenna coil segment formed on a substrate and conductor segments formed at the periphery of the antenna coil segment on substantially the same plane of the antenna coil.

According to the present invention, the conductor segments are disposed at the periphery of the antenna coil segment to suppress an occurrence of the side lobes at the periphery of the antenna coil segment.

An electric field generated by a conductor having a uniform thickness (ideally, a perfect conductor having a uniform resistance) is formed perpendicularly on a main surface of the conductor segment. Since an electromagnetic field formed here is perpendicular to the electric field, no electromagnetic field perpendicular to the conductor segment exists. Accordingly, when the antenna coil of the wireless information storage medium approaches the conductor segment in parallel, an induced voltage is not generated in the antenna coil, thus inhibiting a communication between them. According to the present invention, since the conductor segments are disposed at the periphery of the antenna coil segment, communication spaces are not created in the areas associated with the conductor segments. Creating such non-communication spaces in the desired areas suppresses a communication error.

According to the present invention, the conductor segments may be disposed at any locations in the periphery of the antenna coil segment. For suppressing the communication error, the conductor segments are preferably disposed at all the areas in the periphery of the antenna coil segment; however, the conductor segments may be disposed at only areas where the communication error is likely to occur when the wireless information storage medium approaches. That is, the peripheral area where the wireless information storage medium accidentally approaches may depend on a mounted location of the antenna coil, the layout, and the intended use of the reader/writer device. Selecting the appropriate location and area in accordance with this situation suppresses the communication error, miniaturizes the antenna coil segment, and reduces the cost.

The shape of the antenna coil segment according to the present invention may be any shape; it may be a rectangular loop, a circular loop, or any other shape. A rectangular loop antenna coil requires a conductor segment at the periphery of at least one of the edges thereof.

The following modification is preferable for the present invention: If the conductor segments at the periphery of the antenna coil segment are electrically connected to each other, the conductor segments form one coil, which may cause negative effect on the communication of the antenna coil segment. Therefore, at least part of the conductor segments is electrically insulated to make the conductor segments electrically discontinuous.

The following modification is preferable for the present invention: The conductor segments can be formed from the same conductive pattern as that for the antenna coil segment. To form the antenna coil segment and the conductor segments from the same material, a conductive layer may be formed on a main surface of an insulating substrate, and then the loop antenna coil segment and the conductor segments may be formed by etching.

Creating the antenna coil segment by the conductive pattern formed on the insulating substrate allows the conductor segments to be formed in the same manufacturing step. A low-cost antenna unit can be provided compared to a manufacturing method in which conductor segments manufactured in another step are bonded at the periphery of the antenna coil segment. Additionally, forming the conductor segments by the same conductive pattern as that for the antenna coil segment improves the positioning of the conductor segments to the antenna coil segment, thereby further decreasing an occurrence of the communication errors. Furthermore, forming the conductor segments by the same conductive pattern as that for the antenna coil segment advantageously eliminates an adjustment of the tuning frequency compared to the manufacturing method in which conductor segments manufactured in another step are bonded at the periphery of the antenna coil segment.

The antenna unit according to the present invention can be applied to a reader/writer device in which a communication is performed between a signal processing circuit and a wireless information storage medium with electromagnetic waves induced by coupling an antenna coil of the wireless information storage medium and the antenna coil segment.

Additionally, the antenna unit according to the present invention can be applied to an information processing system including a reader/writer device in which a communication is performed with electromagnetic waves induced by coupling an antenna coil of a wireless information storage medium and the antenna coil segment of the reader/writer device when the wireless information storage medium relatively gets close to the reader/writer device. The information processing system includes, for example, a ticket gate that processes ticket data after wireless transmission and reception of the data, and a mobile phone and a PDA that read information from and write information to a contactless information medium.

According to the present invention, the wireless information storage medium may be of any type. For example, it may be an IC card; however, the wireless information storage medium is not limited to a card. For example, the wireless information storage medium according to the present invention includes information technology equipment that incorporates an IC chip therein, such as a mobile phone.

BEST MODE FOR CARRYING OUT THE INVENTION

Embodiments of the present invention will now be described with reference to the accompanying drawings.

Figure 1:
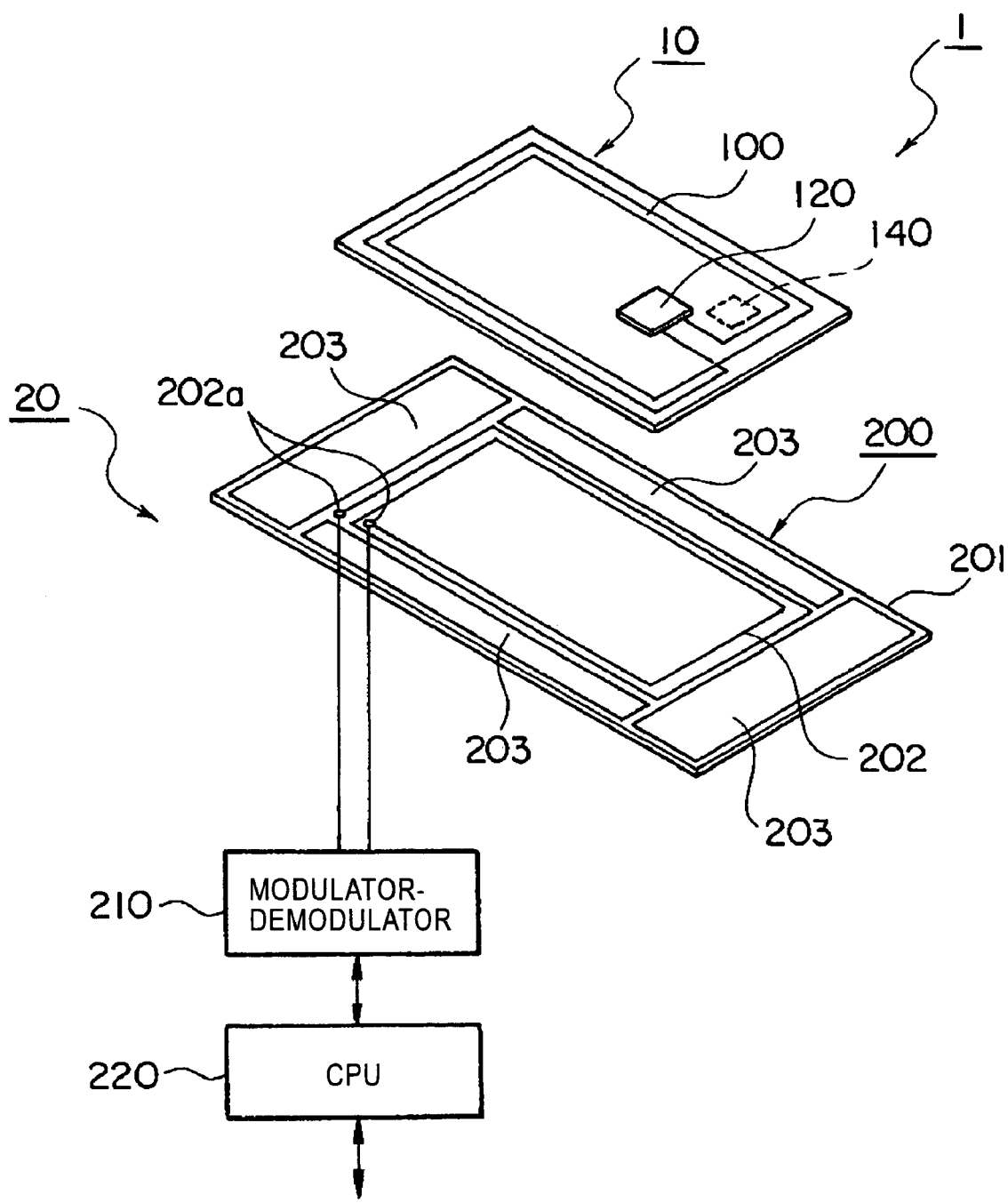
FIG. 1 shows a structure of a wireless information transmitter/receiver according to an embodiment of the present invention.
Figure 2:
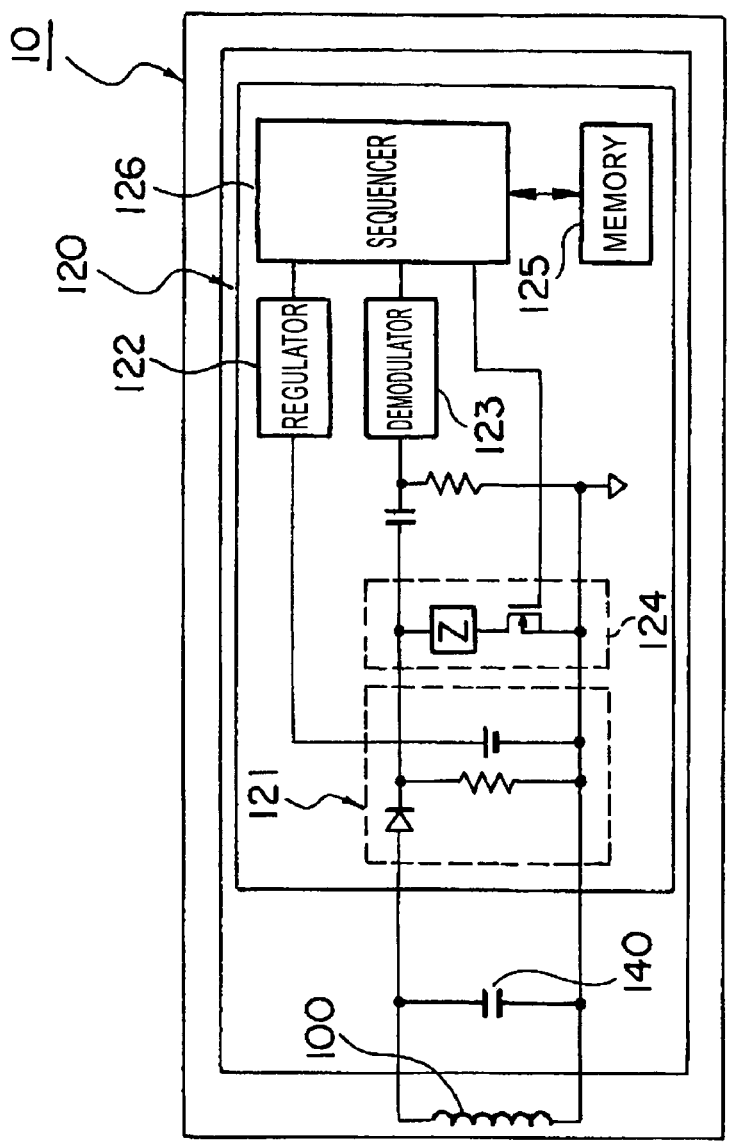
FIG. 2 is a diagram of the equivalent circuit of the wireless information transmitter/receiver shown in FIG. 1.
Figure 2:
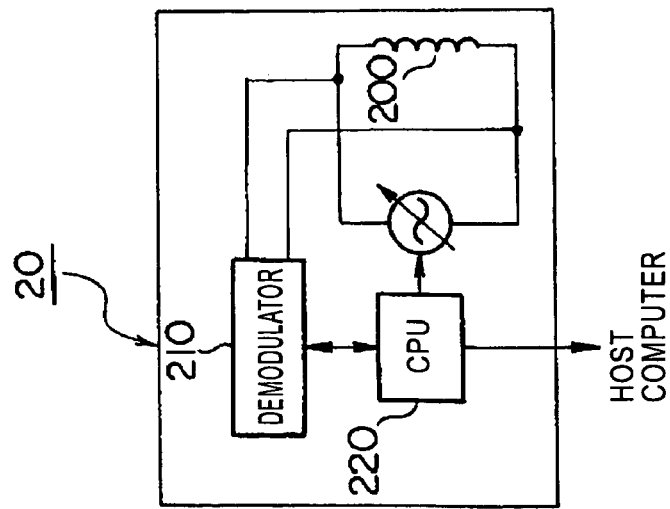

FIG. 1 shows a structure of a wireless information transmitter/receiver according to an embodiment of the present invention. FIG. 2 is a diagram of the equivalent circuit of the wireless information transmitter/receiver shown in FIG. 1.

The wireless information transmitter/receiver according to an embodiment will now be described with reference to FIGS. 1 and 2. A wireless information transmitter/receiver 1 includes an IC card 10 and a reader/writer device 20, which respectively correspond to a wireless information storage medium and a reader/writer device according to the present invention.

The IC card 10 has an antenna coil 100 which constitutes an antenna itself, an IC chip 120, and a tuning capacitor 140 to tune a signal frequency of the antenna.

The IC chip 120 incorporates a rectifier circuit 121, a stabilized power supply circuit 122, modulator-demodulator circuits 123 and 124, a memory 125, and a CPU or a sequencer 126. Data is written into and read from the memory 125 by wireless communication with the reader/writer device 20.

The reader/writer device 20 includes an antenna unit 200, which functions as an antenna and corresponds to the antenna unit according to the present invention, a modulator-demodulator circuit 210, and a CPU 220. The reader/writer device 20 transmits data to the IC card 10 by flowing electric currents modulated from 13.56 MHz carrier with transmitting data to an antenna coil, and receives data from the IC card 10 by flowing unmodulated electric currents to the antenna coil. The modulator-demodulator circuit 210 and the CPU 220 correspond to a signal processing circuit according to the present invention.

When the IC card 10 gets close to the antenna coil of the reader/writer device 20, terminals of the antenna coil 100 of the IC card 10 produce an induced voltage caused by the electromagnetic induction. Accordingly, the IC chip 120 receives a stable power supply voltage from the induced voltage and demodulates modulated waves to receive data transmitted from the reader/writer device 20.

On the other hand, when the IC card 10 transmits data stored in the memory 125 to the reader/writer device 20, the IC card 10 changes the load Z in accordance with the data. The reader/writer device 20 detects the load changes of the antenna coil 100 of the IC card 10 and demodulates them. Accordingly, the IC card 10 transmits the data to the reader/writer device 20.

Thus, the data is transmitted and received between the IC card 10 and the reader/writer device 20. Subsequently, a higher level system of the reader/writer device 20, such as a host computer or an information processor in an automatic ticket gate, can utilize the data to, for example, check passenger tickets or control human entrance.

Figure 3:
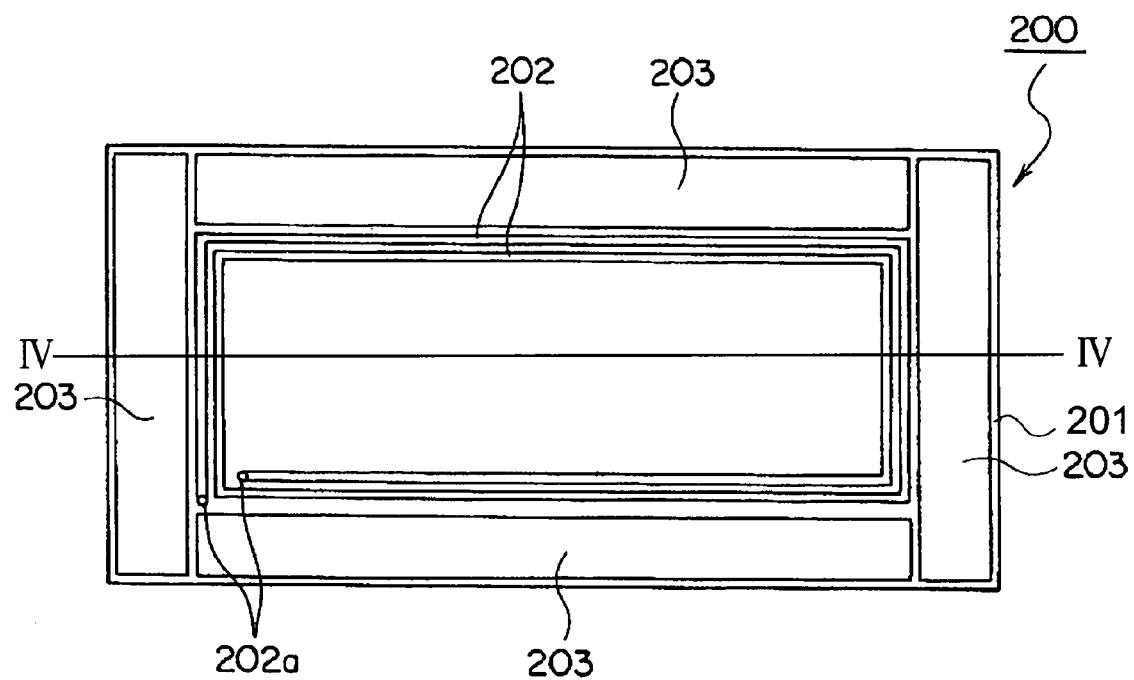
FIG. 3 is a plan view of a whole antenna unit according to an embodiment of the present invention.
Figure 4:
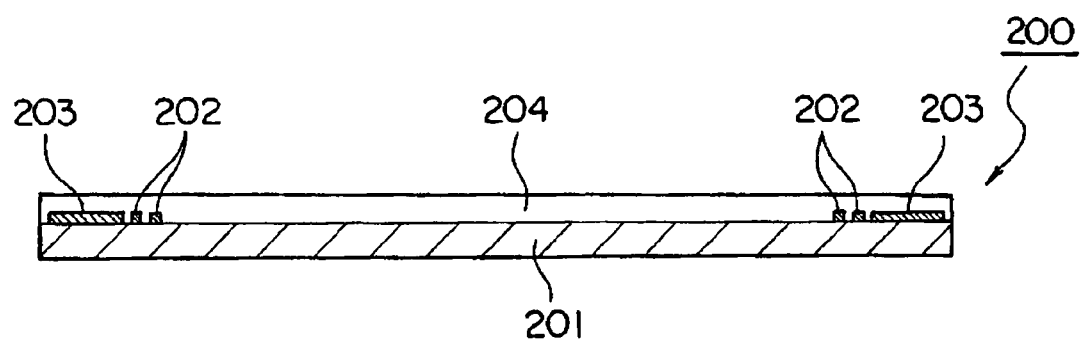
FIG. 4 is a sectional view taken along line IV—IV in FIG. 3.

FIG. 3 is a plan view of a whole antenna unit according to the embodiment of the present invention. FIG. 4 is a sectional view taken along line IV—IV in FIG. 3.

As shown in FIGS. 3 and 4, an antenna coil of the reader/writer device 20 according to the embodiment includes an insulating substrate 201 made of polyimide (PI) resin or polyethylene naphthalate (PEN) resin. The insulating substrate 201 is, for example, 1 mm in thickness. A rectangular loop antenna 202 made of copper or aluminum is formed substantially at the center of one of the main surfaces of the insulating substrate 201. Terminals 202a at both ends of the loop antenna 202 are connected to a signal processing circuit board, on which the modulator-demodulator circuit 210 and the CPU 220 are mounted, via wires.

At the periphery of the four edges of the loop antenna 202, which is disposed substantially at the center of the insulating substrate 201, conductor segments 203 are formed by the same copper or aluminum conductive pattern as that of the loop antenna 202. The conductor segments 203 correspond to side lobe suppressing means according to the present invention. The conductive pattern of the antenna coil segment, which constitute the loop antenna 202, and the conductor segments 203 are, for example, 16 μm in thickness.

In particular, the conductive pattern of the conductor segments 203 is preferably uniform in thickness.

In the antenna unit 200 shown in FIG. 3, each of the four rectangular conductor segments 203 is formed at the periphery of the corresponding edge of the rectangular loop antenna 202 and has a predetermined width. The conductor segments 203 are separated from each other for an electrically insulating purpose. The lengths of the conductor segments 203, which are disposed at the periphery of the edges of the loop antenna 202, are preferably greater than or substantially equal to those of respective edges of the loop antenna 202. The widths of the conductor segments 203 are preferably large. This is because a length greater than that of the antenna coil segment and the largest possible width easily suppress an occurrence of the side lobe S. The details are described below.

However, the conductor segments 203 may be formed as follows, in accordance with the application of the wireless information transmitter/receiver 1 (for example, an information processing of ticket gate, an entrance control, or a register information processing), a position and layout of the antenna unit 200, or the IC card 10 approaching direction.

FIGS. 5 to 8 are plan views of whole antenna units 200 according to other embodiments.

Figure 5:
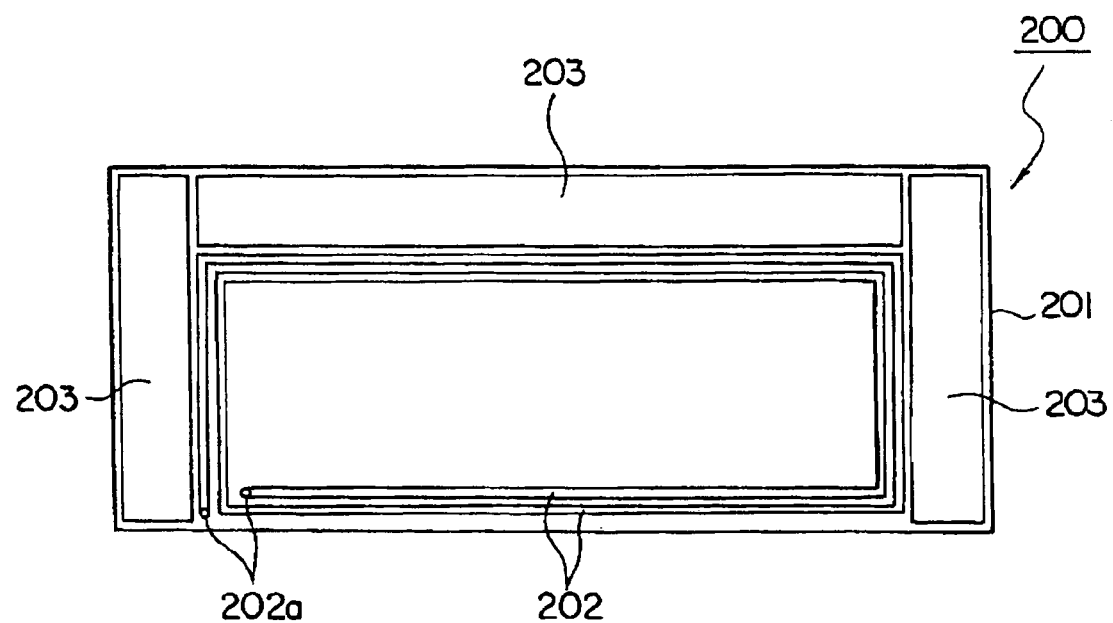
FIG. 5 is a plan view of a whole antenna unit according to anther embodiment of the present invention.

An antenna unit 200 shown in FIG. 5 has a rectangular loop antenna 202 on one of the main surfaces of the insulating substrate 201. The conductor segments 203 are formed at the periphery of three out of the four edges of the loop antenna coil 202. An antenna unit 200 shown in FIG. 6 has a rectangular loop antenna 202 on one of the main surfaces of the insulating substrate 201. The conductor segments 203 are formed at the periphery of two out of the four edges of the loop antenna coil 202. Further, an antenna unit 200 shown in FIG. 7 has a rectangular loop antenna 202 on one of the main surfaces of the insulating substrate 201. The conductor segment 203 is formed at the periphery of one out of the four edges of the loop antenna coil 202.

In these modifications, peripheral areas of the edges where the conductor segments 203 are not disposed are preferably used for areas where the IC card 10 does not approach or the IC card 10 is difficult to approach depending on a position of the antenna unit 200. The conductor segments 203 require their own spaces, thus increasing the size of the antenna unit 200. Accordingly, the antenna unit 200 can be compact and cost-effective by mounting the conductor segments 203 in the minimum area that effectively suppresses a communication error caused by the occurrence of the side lobe S.

Figure 6:
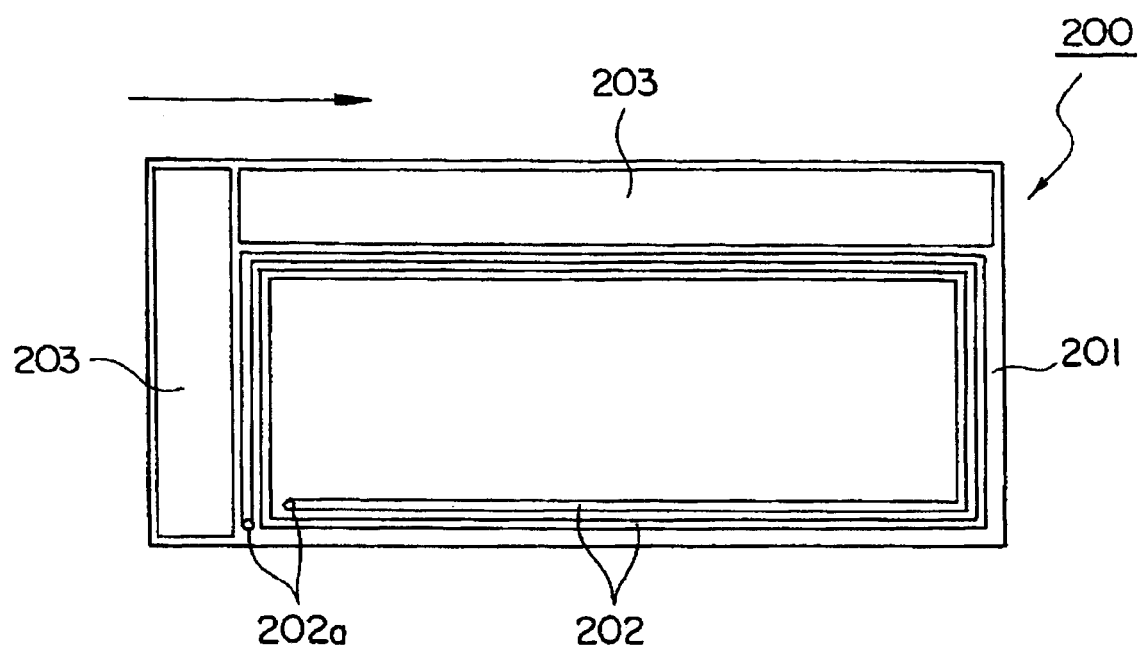
FIG. 6 is a plan view of a whole antenna unit according to another embodiment of the present invention.
Figure 7:
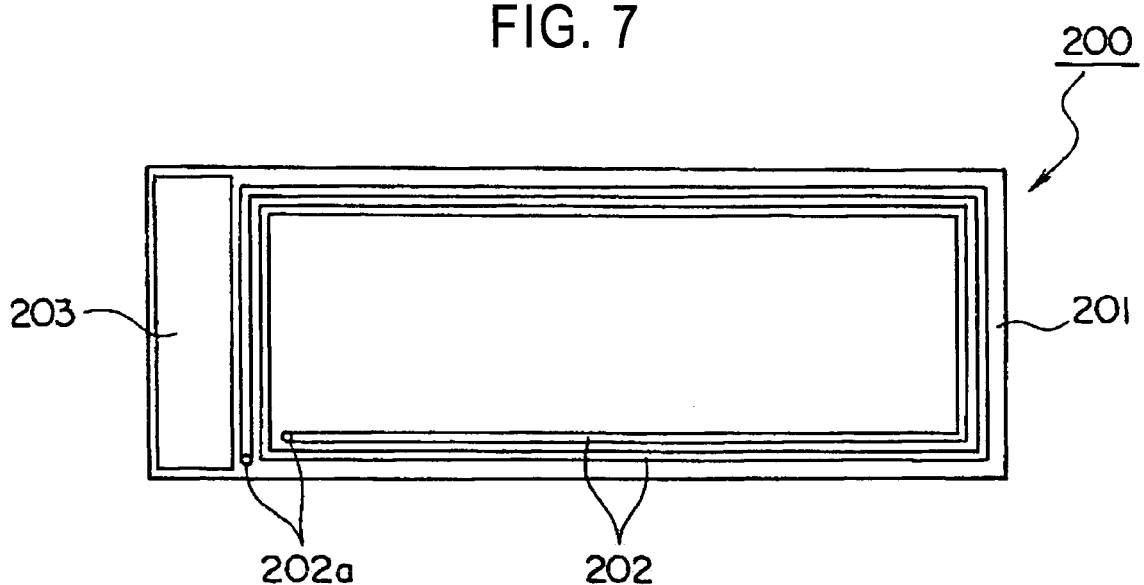
FIG. 7 is a plan view of a whole antenna unit according to another embodiment of the present invention.
Figure 8:
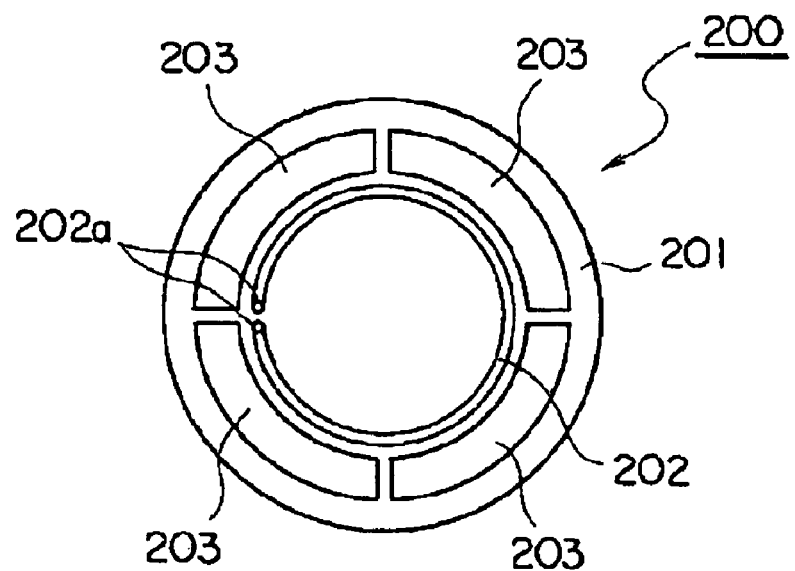
FIG. 8 is a plan view of a whole antenna unit according to another embodiment of the present invention.
Figure 14:
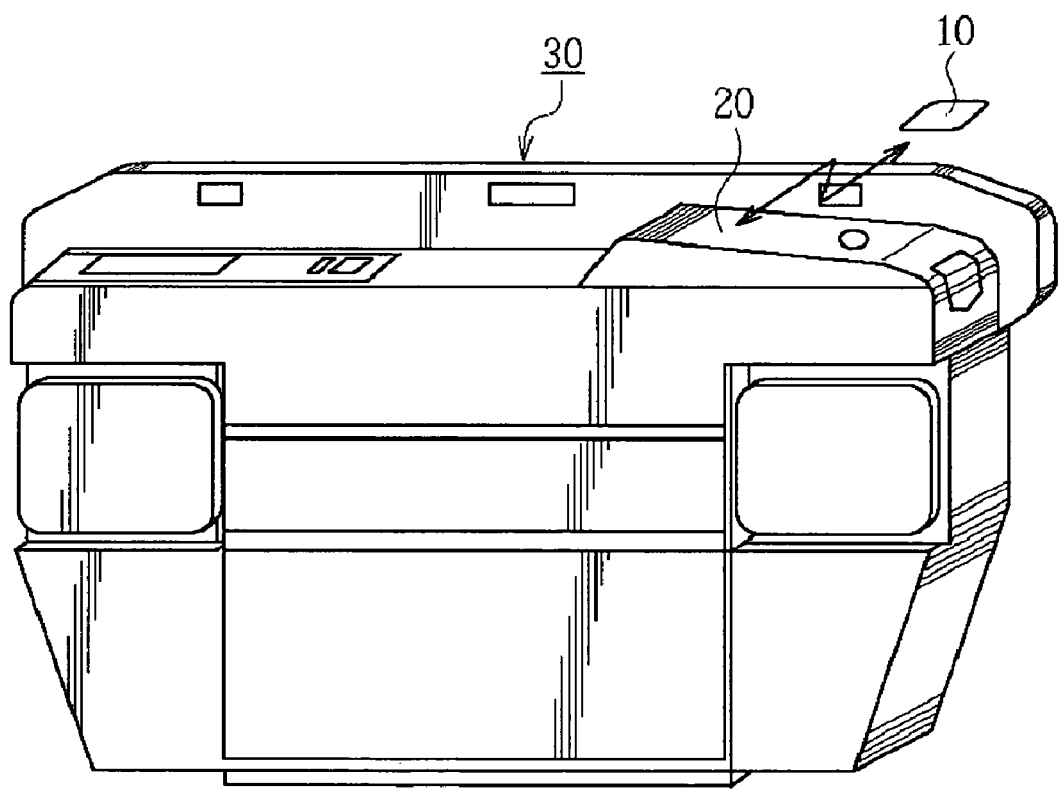
FIG. 14 shows an automatic ticket gate including a reader/writer device according to the embodiment of the present invention.

FIG. 14 shows an example in which the reader/writer device is mounted in an automatic ticket gate for railroads. As shown in FIG. 14, an automatic ticket gate 30 includes the reader/writer device 20, which reads ticket information stored in the contactless IC card 10, on the top surface of the body of the automatic ticket gate 30. A rectangular antenna unit 200 is disposed on the entrance side of the top surface of the automatic ticket gate 30 and generates a main lobe on the upper space by the antenna coil to communicate with the contactless IC card 10. Passengers often mistakingly hold out the IC card 10 at a position little short of the antenna coil in the passing direction or outside of the inside edge, namely, a passenger side of the antenna coil segment. In this case, as shown in FIG. 6, the conductor segments 203 are disposed on two sides closer to the passenger in the passing direction shown by arrow in FIG. 6, and not on the other two sides. This structure provides both prevention of a communication error and the compact, low-cost antenna unit 200. The conductor segments 203 may be disposed on the proximal side and the distal side, and not on right and left sides. Examples shown in FIGS. 5 to 7 are not limited to an automatic ticket gate, and various other changes and modifications can be made therein.

Additionally, a shape of the antenna coil segment of the antenna unit 200 is not limited to the rectangular loop shown in FIGS. 3 to 7. For example, a circular loop shown in FIG. 8 may be employed. In this example, a circular-loop antenna coil segment is formed on one of the main surfaces of the insulating substrate 201. At the periphery of the antenna coil, four conductor segments 203 are disposed at equiangularly circumferentially spaced locations around the antenna coil segment. However, the conductor segments 203 need not be disposed at four equiangularly circumferentially spaced locations. The conductor segment 203 may be disposed in at least part of the peripheral area of the circular loop antenna coil.

With reference again to FIGS. 3 and 4, the insulating substrate 201 and the antenna coil segment can be produced from an insulating substrate of a predetermined size bonded with a copper or aluminum film. The copper or aluminum film is patterned into a desired antenna coil segment, and then unnecessary parts are removed by etching. In this case, the conductor segments 203 are formed in the same patterning and etching steps. Manufacturing the antenna coil segment and the conductor segments 203 in the same patterning and etching steps decreases the total manufacturing steps and the cost. In addition, since the antenna coil segment and the conductor segments 203 are formed by patterning and etching, positioning accuracy is remarkably improved. Furthermore, only initial adjustment of the tuning frequency is necessary, thus considerably simplifying the adjustment.

Thus, the antenna unit 200 is achieved. Additionally, filler resin layers 204 made of epoxy resin and also external packaging resin layers made of polyethylene terephthalate may be formed on both main surfaces of the antenna unit 200. FIG. 4 shows an example in which only the filler resin layer 204 is formed.

The principle that suppresses an occurrence of the side lobe S will now be described.

An electric field E generated by the conductor segments 203 having uniform thicknesses is formed perpendicularly on a main surface of the conductor segments 203. Since an electromagnetic field H formed here is perpendicular to the electric field E, no electromagnetic fields H perpendicular to the conductor segments 203 exist.

Figure 9:
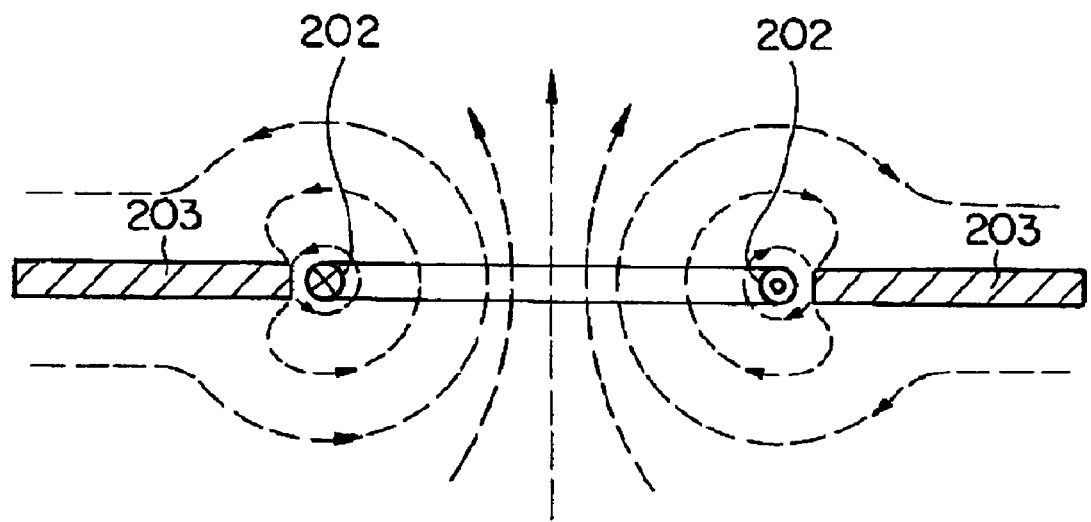
FIG. 9 is a sectional view of magnetic fluxes of the antenna unit according to the embodiment of the present invention.
Figure 10:
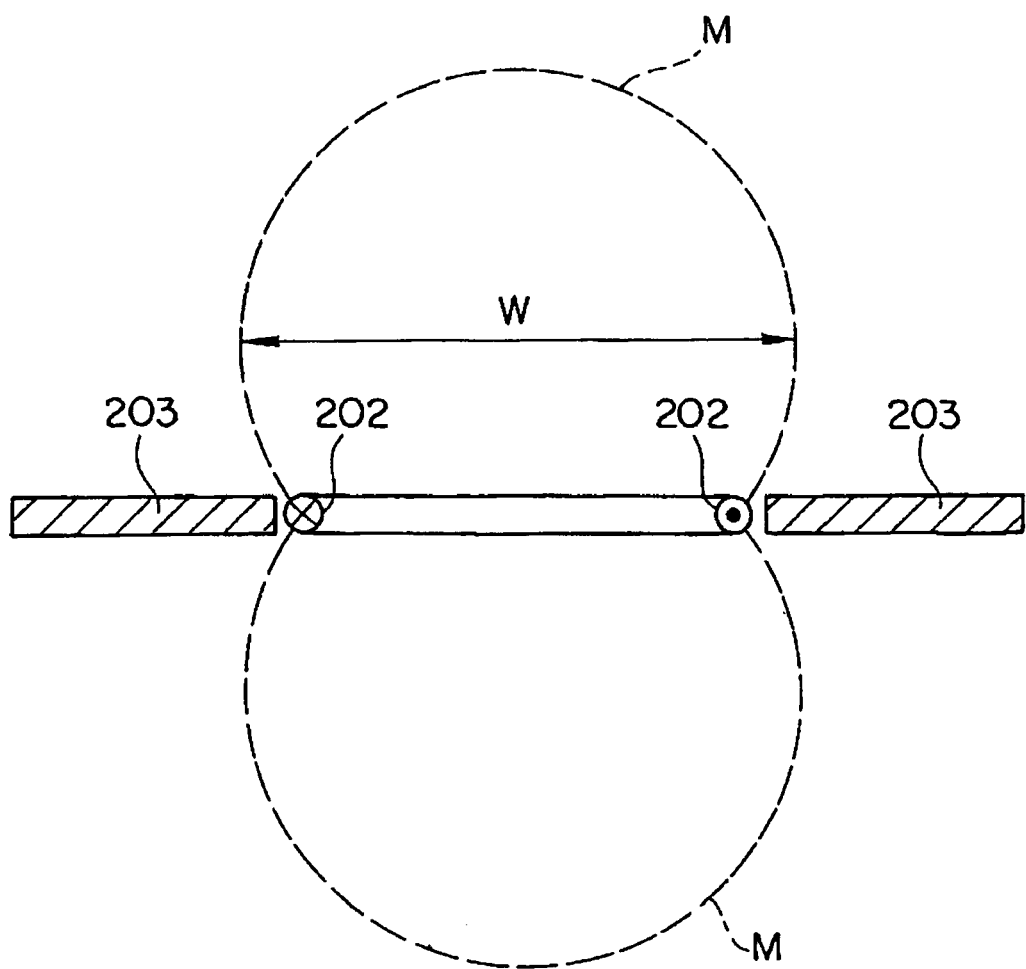
FIG. 10 is a sectional view of a magnetic field of the antenna unit according to the embodiment of the present invention.
Figure 11:
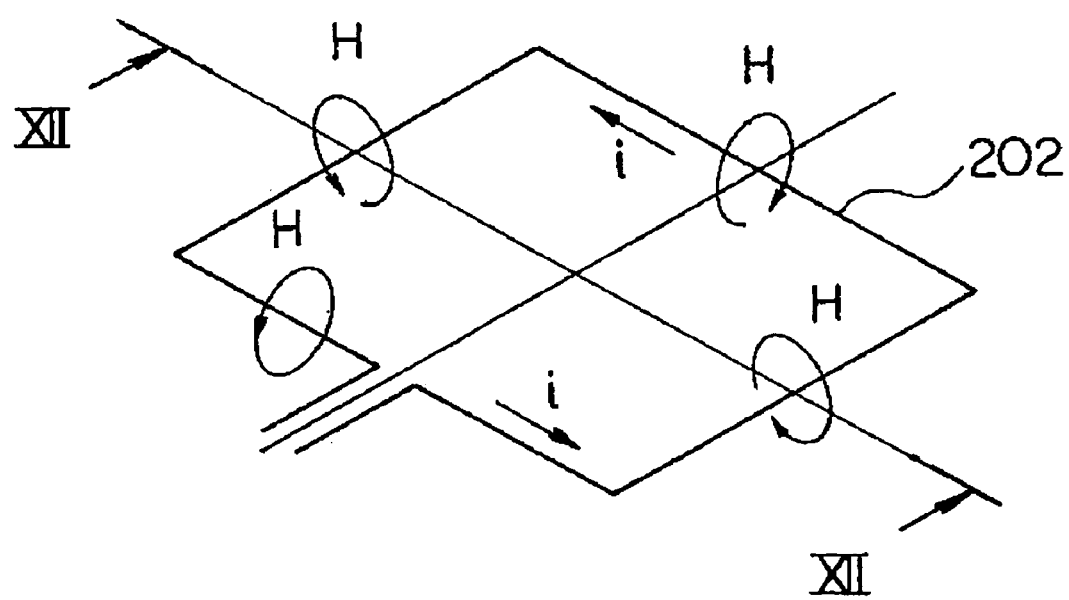
FIG. 11 shows magnetic fluxes of a known antenna unit.
Figure 12:
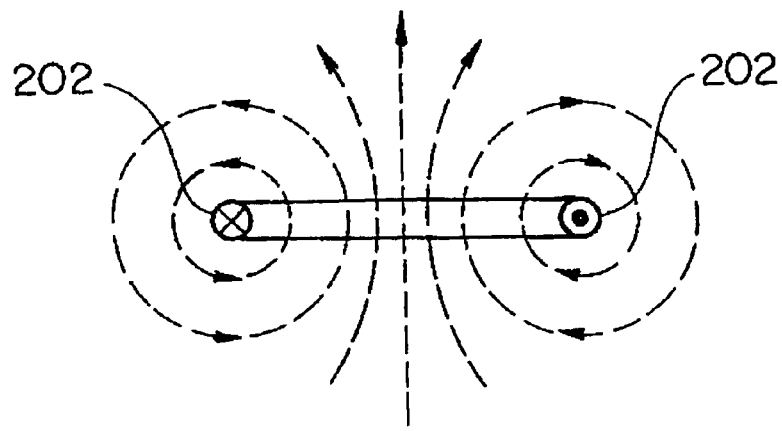
FIG. 12 is a sectional view of the magnetic fluxes of the antenna unit shown in FIG. 11.
Figure 13:
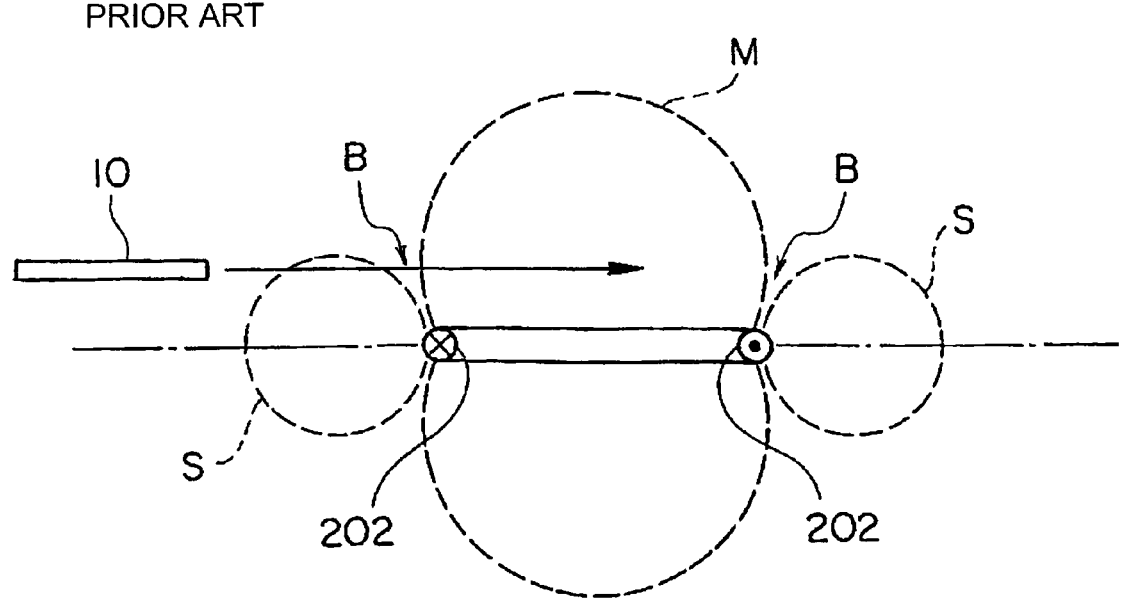
FIG. 13 is a sectional view of a magnetic field of the antenna unit shown in FIG. 11.

FIGS. 9 and 10 are sectional views of the magnetic fluxes and the magnetic fields of the antenna coil according to the embodiment, respectively. In FIGS. 9 and 10, the conductor segments 203 are formed at the periphery of the two opposing edges of the antenna coil segment. As described above, the electromagnetic fields H perpendicular to the main surface of the conductor segments 203 do not occur. A distribution of the magnetic fluxes is shown by dashed lines in FIG. 9. A magnetic field corresponding to the distribution is shown by dashed lines in FIG. 10, in which the main lobe M spreads towards the conductor segments 203, that is, W becomes wider than a conventional W, and the side lobes S, which should occur in the areas associated with the conductor segments 203, disappear.

Consequently, when the antenna coil 100 of the IC card 10 approaches the conductor segments 203 in parallel, an induced voltage does not occur in the antenna coil 100, and therefore a communication, such as exchange of initial information, between the IC card 10 and the reader/writer device 20 is not performed. This eliminates a communication error due to a presence of the side lobes S, as described above. Also, the main lobe M expands towards the conductor segments 203.

The above-described embodiments are described merely for purposes of illustration and are not limited to the present invention. Therefore, various changes and modifications can be made to the elements and their equivalents disclosed in the embodiments without departing from the spirit and scope of the invention.

For example, although the antenna coil is formed on one surface of the insulating substrate 201 in the above-described embodiments, the antenna coil may be composed of transmitting and receiving antenna coils, which are separately mounted on two surfaces of the insulating substrate 201. In this case, the conductor segments 203 may be disposed on either one surface or both surfaces of the insulating substrate 201.

As described above, according to the present invention, an antenna unit that prevents a communication error by suppressing side lobes formed by an antenna coil segment of a reader/writer device, and a reader/writer device, an information processing system and a communication method including the antenna unit can be provided. Also, a method for manufacturing the antenna unit can be provided.

What is claimed is:

1. A reader/writer device comprising:
   an antenna unit including an insulating substrate, a loop antenna coil on the insulating substrate, and conductor segments formed at the periphery of the antenna coil, the antenna coil and the conductor segments being in substantially the same plane to generate an electric field which is perpendicular on a main surface of the conductor segments to thereby suppress an occurrence of side lobes in the reader/writer device;
   wireless communication means for transmitting data to and receiving data from a wireless information storage medium in the form of electromagnetic waves output from the antenna coil; and
   a processing circuit for processing the data.

2. The reader/writer device according to claim 1, wherein the loop antenna coil is rectangular or circular.

3. The reader/writer device according to claim 2, wherein the conductor segments are disposed at the periphery of at least one of the edges of the rectangular loop antenna coil.

4. The reader/writer device according to claim 3, wherein the length of the conductor segments is greater than or substantially equal to the length of one of the edges of the rectangular loop antenna coil, and the width of the conductor segments is greater than the width of the rectangular loop antenna coil.

5. The reader/writer device according to claim 1, wherein the conductor segments are electrically discontinuous.

6. The reader/writer device according to claim 1, wherein the conductor segments are disposed in the areas adjacent to the proximal end and the inner side of the antenna coil in the moving direction of the wireless information storage medium.

7. The reader/writer device according to claim 1, wherein the conductor segments are disposed in the areas adjacent to the proximal end and the distal end of the antenna coil in the moving direction of the wireless information storage medium.

8. The reader/writer device according to claim 1, wherein the conductor segments and the antenna coil are formed of a single conductive material.

9. The reader/writer device according to claim 1, wherein the conductor segments and the antenna coil are formed by patterning a conductive layer on a main surface of the insulating substrate with an etching process.

10. An automatic ticket gate for checking tickets comprising a reader/writer device, said reader/writer device comprising:

an antenna unit including an insulating substrate, a loop antenna coil on the insulating substrate, and conductor segments formed at the periphery of the antenna coil, the antenna coil and the conductor segments being in substantially the same plane to generate an electric field which is perpendicular on a main surface of the conductor segments to thereby suppress an occurrence of side lobes in the reader/writer device;

wireless communication means for transmitting data to and receiving data from a wireless information storage medium in the form of electromagnetic waves output from the antenna coil; and a processing circuit for processing the data.

* * * * *